(12) United States Patent
Freeman et al.

(10) Patent No.: US 8,201,712 B2
(45) Date of Patent: Jun. 19, 2012

(54) CARTON-BASED PACKAGING FOR A BEVERAGE DISPENSER

(75) Inventors: T. Edwin Freeman, Woodstock, GA (US); Robert Hughes, Atlanta, GA (US); Daniel S. Quartarone, Stone Mountain, GA (US)

(73) Assignee: The Coca-Cola Company, Atlanta, GA (US)

( * ) Notice: Subject to any disclaimer, the term of this patent is extended or adjusted under 35 U.S.C. 154(b) by 1170 days.

(21) Appl. No.: 12/026,678

(22) Filed: Feb. 6, 2008

(65) Prior Publication Data

US 2009/0194560 A1    Aug. 6, 2009

(51) Int. Cl.
*G01F 11/00* (2006.01)
(52) U.S. Cl. .............. 222/386; 222/1; 222/94; 222/105; 222/129.4; 222/135; 220/666; 229/101
(58) Field of Classification Search ............... 222/1, 135, 222/129.1, 385, 129.2, 129.3, 129.4, 132–133, 222/386, 146.6, 92, 94, 107, 105; 229/101; 220/666–667, 833, 904
See application file for complete search history.

(56) References Cited

U.S. PATENT DOCUMENTS

| | | | | |
|---|---|---|---|---|
| 3,280,871 A | * | 10/1966 | Taylor | 190/103 |
| 4,362,255 A | * | 12/1982 | Bond | 222/107 |
| 4,375,864 A | * | 3/1983 | Savage | 222/81 |
| 4,753,370 A | | 6/1988 | Rudick | |
| 5,037,002 A | * | 8/1991 | Tschanen | 222/105 |
| 5,562,221 A | * | 10/1996 | Beniacar | 215/386 |
| 5,620,550 A | | 4/1997 | Andersson et al. | |
| 5,651,482 A | | 7/1997 | Sizemore | |
| 6,394,336 B1 | * | 5/2002 | Beneroff et al. | 229/101 |
| 6,767,600 B1 | * | 7/2004 | Kasahara | 428/35.6 |
| 6,780,269 B2 | | 8/2004 | Kobayashi et al. | |
| 7,237,729 B2 | * | 7/2007 | Chen | 239/328 |
| 7,293,675 B1 | * | 11/2007 | Luhn | 222/148 |
| 7,600,653 B2 | * | 10/2009 | Kasboske | 220/648 |
| 2003/0207054 A1 | | 11/2003 | Magnusson | |
| 2005/0236429 A1 | * | 10/2005 | Duck et al. | 222/137 |
| 2006/0163282 A1 | * | 7/2006 | Suzuki | 222/135 |
| 2007/0059541 A1 | | 3/2007 | Yoshida et al. | |
| 2007/0068842 A1 | | 3/2007 | Pasbrig | |
| 2007/0205221 A1 | | 9/2007 | Carpenter et al. | |
| 2008/0078781 A1 | * | 4/2008 | Py et al. | 222/96 |
| 2008/0190961 A1 | * | 8/2008 | Wyner et al. | 222/207 |

FOREIGN PATENT DOCUMENTS

EP    1829818 A2    9/2007

* cited by examiner

*Primary Examiner* — Frederick C. Nicolas

(74) *Attorney, Agent, or Firm* — Sutherland Asbill & Brennan LLP

(57) ABSTRACT

A dispenser for combining a number of ingredients. The dispenser may include a laminated container with one of the number of ingredients therein and a pump in communication with the laminated container.

17 Claims, 2 Drawing Sheets

CARTON-BASED PACKAGING FOR A BEVERAGE DISPENSER

TECHNICAL FIELD

The present application relates generally to packaging for fluids and more particularly relates to carton-based packaging for micro-ingredients and other types of ingredients used in a beverage dispenser and other types of dispensing equipment.

BACKGROUND OF THE INVENTION

Beverage dispensers traditionally mix a syrup and/or other types of concentrates with a diluent such water or carbonated water to produce a beverage. The syrup or other type of concentrate generally is placed in a tank, a bag-in-box, or other type of container. The size of these containers, however, limits the variety of the different beverages and beverage options available to the consumer at the beverage dispenser, i.e., there is generally only so much room to position the ingredient containers about the beverage dispenser.

One improvement has been to separate the beverage components and then concentrate the several components even further. For example, commonly owned U.S. Pat. No. 4,753,370 concerns a "Tri-Mix Sugar Based Dispensing System." This patent describes a beverage dispensing system that separates the highly concentrated flavorings from the sweetener and the diluent. This separation allows for the creation of numerous beverage options using several flavor modules and one universal sweetener. U.S. Pat. No. 4,753,370 is incorporated herein by reference.

The concept of separation was taken even further in commonly owned U.S. Publication No. 2007/0205221, entitled "Beverage Dispensing System", filed on Mar. 6, 2006. This application describes concentrating the flavors, the colors, the sweeteners, and other additives into micro-ingredients, i.e., concentrations of about ten to one (10:1) or much higher. The beverage dispenser then combines these micro-ingredients with various types of macro-ingredients, such as sweeteners, and with diluents to form a beverage. U.S. Publication No. 2007/0205221 is incorporated herein by reference.

One of the issues with the micro-ingredients is how to provide an adequate package to transport the micro-ingredients to the beverage dispenser and to maintain the micro-ingredients while in the beverage dispenser given that relatively small amounts that may be used. Such a package preferably would provide adequate protection against degradation of the micro-ingredients while being efficient in term of space, volume, and cost.

SUMMARY OF THE INVENTION

The present application thus provides a dispenser for combining a number of ingredients. The dispenser may include a laminated container with one of the number of ingredients therein and a pump in communication with the laminated container.

The laminated container may include a paper layer and one or more polymeric layers. The paper layer may include about 75% of the laminated container. The laminated container also may include a metallic layer. The laminated container may include a fitment thereon. The laminated container may include a first end and the fitment is positioned about the first end. The pump may include a fixed displacement pump. The pump evacuates more than 97% of the ingredient within the laminated container. The laminated container may include folds and/or contraction means thereon. The laminated container may include a box-like shape and/or a wedge-like shape.

The dispenser further may include a number of laminated containers and a number of pumps. The laminated container may include a micro-ingredient therein. The laminated container may include an aseptic container.

The present application further describes a beverage dispenser for combining a number of micro-ingredients. The beverage dispenser may include an aseptic container with one of the number of micro-ingredients therein with a paper layer and one or more polymeric layers and a pump in communication with the aseptic container. The aseptic container may include a metallic layer. The aseptic container may include a fitment thereon. The pump evacuates more than 97% of the micro-ingredient within the aseptic container.

The present application further describes a method of providing a micro-ingredient for use in a beverage dispenser. The method may include the steps of erecting a laminated container, filling the laminated container aseptically with the micro-ingredient, installing the laminated container in the beverage dispenser, and pumping the micro-ingredient from the laminated container via a fixed displacement pump.

These and other features of the present application will become apparent to one of ordinary skill in the art upon review of the following detailed description when taken in conjunction with the several drawings and the appended claims.

DETAILED DESCRIPTION

Figure 1:
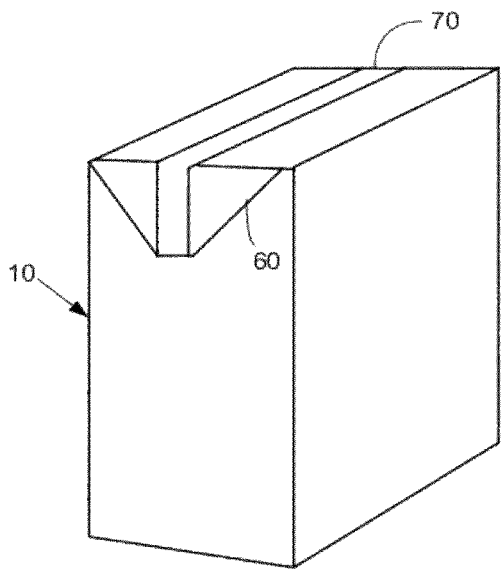
FIG. 1 is a perspective view of a known container.
Figure 2:
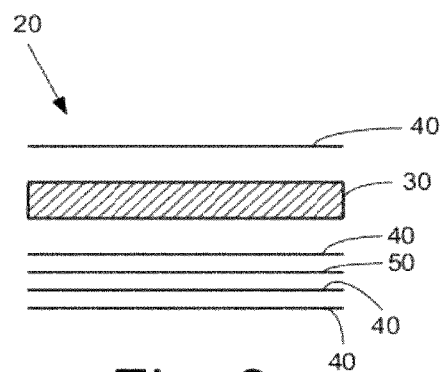
FIG. 2 is side cross-sectional view of the laminate used in the container of FIG. 1.

Referring now to the drawings, in which like numerals refer to like elements throughout the several views, FIG. 1 shows a container 10 as is known in the art. The container 10 may be commercially available from, by way of example, Tetra-Pak Inc. of Vernon Hills, Ill. and sold under the marks "Tetra-Brik" and "Tetra-Wedge." As is shown in FIG. 2, the container 10 may be made out of a laminate 20. The laminate 20 may include a paper material 30, a polymeric material 40, and aluminum foil 50. The paper material 30 provides strength and stiffness to the container 10. The polymeric film or films 40 provide a barrier against permeation and micro-organisms and ensures a liquid tight seal. The aluminum foil layer 50 serves to provide a further barrier against light to ensure a high degree of product integrity and the retention of nutrients.

As is known, the container 10 may have one or more folds 60 and a seal 70. The container 10 may be aseptically filled with a fluid and sealed as is known in the art. To date, the container 10 generally has been used for materials such as milks, juices, and other types of beverages.

Other types of containers 10 and laminates 20 may be used herein. For example, containers 10 offered by SIG of Neuhausen am Rheinfall, Switzerland and sold under the mark Combibloc may be used herein. Other containers 10 may include those offered by Elopak of Norway and sold under the mark Pure-Pak. Similar containers 10 may be used herein. The container 10 may have any desired size or shape. Different sizes and shapes may be used herein with different types of micro-ingredients or other types of fluids.

Figure 3:
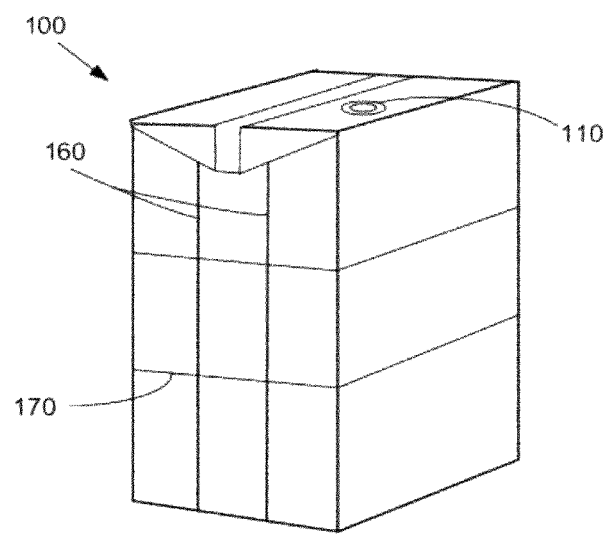
FIG. 3 is a perspective view of a container with a fitment thereon as is described herein.

FIG. 3 shows a container 100 as is described herein. The container 100 may be largely identical to the container 10 described above but with the addition of a fitment 110 thereon. The fitment 110 may be of conventional design and may be made from a plastic material. Examples of fitments 110 include those manufactured by Innovative Packaging Network (IPN) of Houten, Netherlands, and similar designs. The fitment 110 may be attached to the container 100 via an adhesive or other type of bonding means.

Figure 4:
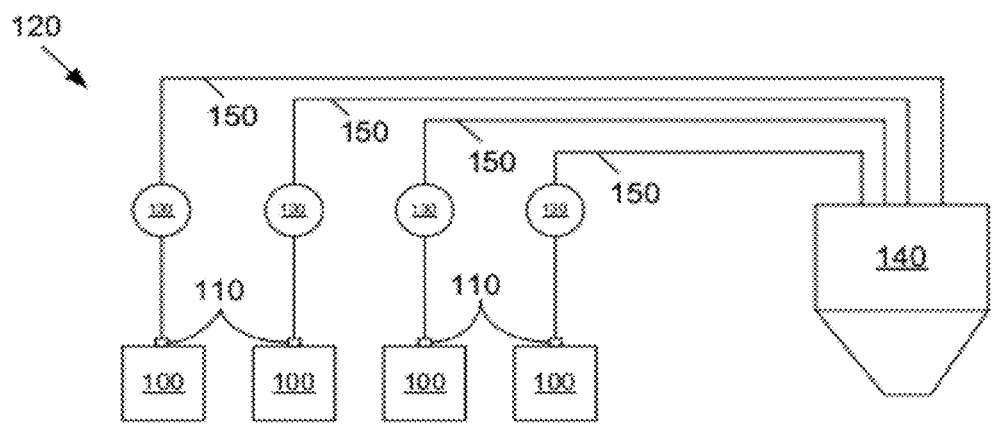
FIG. 4 is a schematic view of a beverage dispenser using the container of FIG. 3.

The container 100 may be used with a beverage dispenser 120 as is shown in FIG. 4. The beverage dispenser 120 may be of conventional design. Specifically, the beverage dispenser 120 may include one or more pumps 130 and a dispensing nozzle 140. The container 100 may be in communication with one of the pumps 130 via a line 150 attached to the fitment 110. Multiple containers 100 and pumps 130 may be used herein. The pumps 130 may be of conventional design. More specifically, the pumps 130 may be similar to that described in commonly owned U.S. Ser. No. 11/869,759, entitled "Fixed Displacement Pump", filed on Oct. 10, 2007 and incorporated herein by reference. A fixed displacement pump may be preferred given the relatively small amounts of micro-ingredients that may be pumped. The dispensing nozzle 140 may be of conventional design. More specifically, the dispensing nozzle 140 may be similar to those described in commonly owned U.S. Publication No. 2004/0040983 A1, entitled "Dispensing Nozzle", filed on Sep. 3, 2202; U.S. Publication No. 2006/0191964 A1, entitled "Dispensing Nozzle", filed on Mar. 6, 2006; and/or U.S. Ser. No. 11/782,833, entitled "Dispensing Nozzle Assembly", filed on Jul. 25, 2007. Each of these applications is incorporated herein by reference.

As described above, the known containers 10 are generally used with drinking straws or the fluid therein may be poured out of the container 10. Generally described, these known containers 10 have not been used with any sort of pumping means. The positioning of the container 100 and the fitment 110 thereon thus has been considered in terms of the amount of product that can be removed from the container 100. For example, if the container 100 is in a horizontal position with the fitment 110 at the lower front end of the container 100, about 4.9% of the product may remain. If the product 100 is positioned at a slant, the percentage of product remaining may be reduced to about 2.1% with the pump 130 pulling a vacuum. Placing the container 100 in a vertical position with the fitment 110 at the bottom of the container 100 left about 2.5% of product remaining. The amount of the product left in the container 100 and the amount of the vacuum being pulled by the pumps 130 thus varies.

The container 100 was given a number of fold lines 160 along the sides so as to assist in contracting the container 100. For example, a container 100 with the fold lines therein and the fitment 110 at the lower corner evacuated all but about 1.0% of the product. Various types of contraction means 170 also were evaluated. These contraction means 170 may include the use of common rubber bands to assist in squeezing the product out of the container 100. Other types of contraction means 170 such as springs, other types of loading mechanisms, and the like may be used herein. Further, the folds 60 about the bottom or the top of the container may be unfolded in whole or in part to assist in evacuating the product therein.

Figure 5:
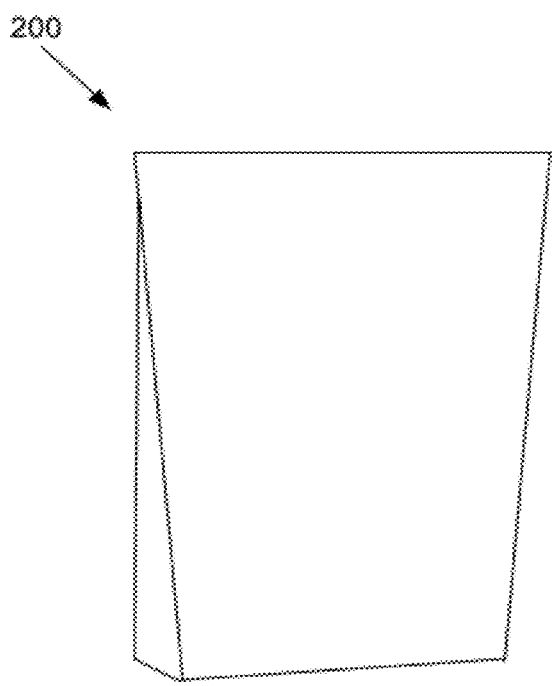
FIG. 5 is an alternative embodiment of a container as is described herein.

In a further embodiment as is shown in FIG. 5, a wedge-shaped container 200 also may be used. The wedge-shaped container 200 may be similar to the Tetra Wedge product described above and have about five sides as is shown. The use of the wedge-shaped container 200 with unfolded ends and the fitment 110 at the lower edge left about 1% of the product therein. The use of the contraction means 170 also reduced the amount of product to about 0.8% and lower. In all, remnant levels range from less than about 1% to more than about 50% depending upon the orientation and adaptation of the container 100, 200 and the vacuum being pulled by the pump 130. Specifically, target evacuation levels of less than about 3% of product remaining therein have been met, i.e., evacuation levels of more than 97% are possible.

The container 100, 200 thus provides a low cost, volumetrically efficient solution to the packaging and use of micro-ingredients. Specifically, the container 100, 200 may be provided with about 96% product and only about 4% packaging material. Due to this volumetric efficiency, the containers 100, 200 are cost effective in terms of transportation and storage and in terms of the environmental impact in that about 75% of the container 100, 200 is renewable paper and only about 20% of the container 100, 200 is a thermoplastic with only about 5% percent as aluminum foil. Other percentages may be used herein.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A dispenser for combining a number of ingredients, comprising:
    a laminated container with one of the number of ingredients therein;
    wherein the laminated container comprises vertical contraction means thereon; and
    wherein the laminated container comprises a paper layer and one or more polymeric layers and wherein the paper layer comprises about 75% of the laminated container; and
    a pump in communication with the laminated container.

2. The dispenser of claim 1, wherein the laminated container comprises a metallic layer.

3. The dispenser of claim 1, wherein the laminated container comprises a fitment thereon.

4. The dispenser of claim 3, wherein the laminated container comprises a first end and wherein the fitment is positioned about the first end.

5. The dispenser of claim 1, wherein the pump comprises a fixed displacement pump.

6. The dispenser of claim 1, further comprising a plurality of laminated containers and a plurality of pumps.

7. The dispenser of claim 1, wherein the laminated container comprises a micro-ingredient therein; wherein the micro-ingredient comprises a reconstitution ratio of about ten to one or higher.

8. The dispenser of claim 1, wherein the pump evacuates more than 97% of the ingredient within the laminated container.

9. The dispenser of claim 1, wherein the laminated container comprises folds thereon.

10. The dispenser of claim 1, wherein the laminated container comprises a box-like shape.

11. The dispenser of claim 1, wherein the laminated container comprises a wedge-like shape.

12. The dispenser of claim 1, wherein the laminated container comprises an aseptic container.

13. A beverage dispenser, comprising:
   an aseptic container;
   one of a plurality of micro-ingredients therein;
   wherein the plurality of micro-ingredients comprises a reconstitution ratio of about ten to one or higher;
   the aseptic container comprising a paper layer and one or more polymeric layers; and
   a pump in communication with the aseptic container.

14. The beverage dispenser of claim 13, wherein the aseptic container comprises a metallic layer.

15. The beverage dispenser of claim 13, wherein the aseptic container comprises a fitment thereon.

16. The beverage dispenser of claim 13, wherein the pump evacuates more than 97% of the micro-ingredient within the aseptic container.

17. A method of providing a micro-ingredient for use in a beverage dispenser, comprising:
   erecting a laminated container;
   filling the laminated container aseptically with the micro-ingredient;
   wherein the micro-ingredient comprises a reconstitution ratio of about ten to one or higher;
   installing the laminated container in the beverage dispenser; and
   pumping the micro-ingredient from the laminated container via a fixed displacement pump.

* * * * *